United States Patent
Yang

(10) Patent No.: US 10,853,858 B2
(45) Date of Patent: *Dec. 1, 2020

(54) SYSTEMS AND METHODS FOR OPTIMIZING NORMALIZATION OF PRODUCT ATTRIBUTES FOR A WEBPAGE OF AN ONLINE RETAILER

(71) Applicant: Walmart Apollo, LLC, Bentonville, AR (US)

(72) Inventor: Binwei Yang, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 126 days.

This patent is subject to a terminal disclaimer.

(21) Appl. No.: 15/358,809

(22) Filed: Nov. 22, 2016

(65) Prior Publication Data

US 2018/0121979 A1 May 3, 2018

Related U.S. Application Data

(63) Continuation-in-part of application No. 15/337,497, filed on Oct. 28, 2016.

(51) Int. Cl.
*G06Q 30/06* (2012.01)
*G06F 16/178* (2019.01)
*G06F 16/25* (2019.01)
*G06F 16/23* (2019.01)

(52) U.S. Cl.
CPC ..... *G06Q 30/0603* (2013.01); *G06F 16/1794* (2019.01); *G06F 16/23* (2019.01); *G06F 16/258* (2019.01)

(58) Field of Classification Search
CPC .......... G06Q 30/0603; G06F 17/30569; G06F 16/1794; G06F 16/23; G06F 16/258
See application file for complete search history.

(56) References Cited

U.S. PATENT DOCUMENTS

| | | | |
|---|---|---|---|
| 7,698,170 B1 | 4/2010 | Darr et al. | |
| 7,720,720 B1 | 5/2010 | Sharma et al. | |
| 7,865,358 B2 * | 1/2011 | Green | G06F 17/2785 704/10 |
| 2006/0095521 A1 * | 5/2006 | Patinkin | G06Q 10/107 709/206 |

(Continued)

*Primary Examiner* — Ashish Thomas
*Assistant Examiner* — Aryan D Toughiry
(74) *Attorney, Agent, or Firm* — Bryan Cave Leighton Paisner LLP

(57) ABSTRACT

Systems and methods including one or more processing modules and one or more non-transitory storage modules storing computing instructions configured to run on the one or more processing modules and perform acts of receiving a plurality of normalization rules, using the plurality of normalization rules and a multi-class classification algorithm to train a classification model for one or more product attributes of a plurality of products, determining additional normalization rules for transforming additional structured values to additional final normalized values based on a classification of un-normalized additional raw source values with the classification model, validating the additional normalization rules, and adding the additional normalization rules to the classification model if the additional normalization rules are validated.

20 Claims, 7 Drawing Sheets

(56) References Cited

U.S. PATENT DOCUMENTS

| | | | |
|---|---|---|---|
| 2011/0069174 A1* | 3/2011 | Rapoport | G07D 7/128 |
| | | | 348/161 |
| 2012/0331484 A1 | 12/2012 | Vickers et al. | |
| 2014/0122203 A1* | 5/2014 | Johnson | G06Q 30/00 |
| | | | 705/14.23 |
| 2017/0255874 A1* | 9/2017 | Chafle | G06F 11/00 |
| 2017/0308592 A1* | 10/2017 | Agrawal | G06F 17/30554 |
| 2018/0121979 A1 | 5/2018 | Yang | |

* cited by examiner

400

405 – Defining a domain specific language to extract structured values of one or more product attributes of a plurality of products from raw source values of a plurality of vendor data sheets received by an online retailer.

410 – Extracting the structured values of the one or more product attributes from the raw source values of the plurality of vendor data sheets.

415 – Obtaining a plurality of normalization rules for use on a webpage of the online retailer and for transforming the structured values to final normalized values.

420 – Optimizing the domain specific language to reduce a number of the normalization rules.

425 – Normalizing the structured values by adding the domain specific language to a runtime normalization process.

430 – Persisting the final normalized values in a catalog of the online retailer.

(A)

432 – Coordinating a first display of the final normalized values on the webpage of the online retailer on an electronic device of a user.

435 – Receiving an online search query entered by a user of the online retailer.

440 – Determining additional products for display on an electronic device of the user in response to the online search query by extracting additional structured values from the online search query using the domain specific language and normalizing the additional structured values by adding the domain specific language to an additional runtime normalization process.

445 – Coordinating a second display on the electronic device of the user of the online retailer, the second display comprising the additional products as determined.

FIG. 4

Fabric Material
- ❏ Cotton
- ❏ Cotton Blend
- ❏ Polyester
- ❏ 1% Cotton
- ❏ 1% Polyester
- ❏ 100% Cotton
- ❏ 12% Rayon
- ❏ 38% Cotton
- ❏ 4% Polyester
- ❏ 40% Polyester
- ❏ 5% Polyester
- ❏ 50% COTTON
- ❏ 50% Cotton
- ❏ 50% Polyester
- ❏ 53% Cotton
- ❏ 60% Cotton
- ❏ 60% Cotton/40% Polyester
- ❏ 92% Polyester, 8% Spandex
- ❏ Acrylic
- ❏ Cotton/Poly Blend

FIG. 6A

Fabric Material
- ❏ Acrylic
- ❏ Cotton
- ❏ Cotton Blend
- ❏ Nylon
- ❏ Polyester
- ❏ Rayon
- ❏ Other Fiber

FIG. 6B

SYSTEMS AND METHODS FOR OPTIMIZING NORMALIZATION OF PRODUCT ATTRIBUTES FOR A WEBPAGE OF AN ONLINE RETAILER

CROSS-REFERENCE TO RELATED APPLICATIONS

This application is a continuation-in-part of U.S. patent application Ser. No. 15/337,497, filed Oct. 28, 2016 and titled "Systems and Methods for Optimizing Normalization of Product Attributes for a Webpage of an Online Retailer," the disclosure of which is incorporated herein by reference in its entirety.

TECHNICAL FIELD

This disclosure relates generally to optimizing normalization of product attributes for a webpage of an online retailer.

BACKGROUND

Application of conventional normalization rules to source data in conventional systems often results in inconsistent and/or incorrect values. For example, application of a first normalization rule to a raw value can result in a first final value, and application of a second normalization rule to a second normalization to the same raw value expressed differently can result in a second final value different from the first final value. Therefore, two un-normalized values expressed differently, but actually equal in dimension, can result in different sizes based on the normalization rules.

BRIEF DESCRIPTION OF THE DRAWINGS

To facilitate further description of the embodiments, the following drawings are provided in which:

FIG. 4 is a first flowchart for a method, according to certain embodiments;

FIG. 6A illustrates a display of values on a webpage according to conventional system and methods;

FIG. 6B illustrates a display of final normalized values on a webpage, according to an embodiment.

Figure 1:
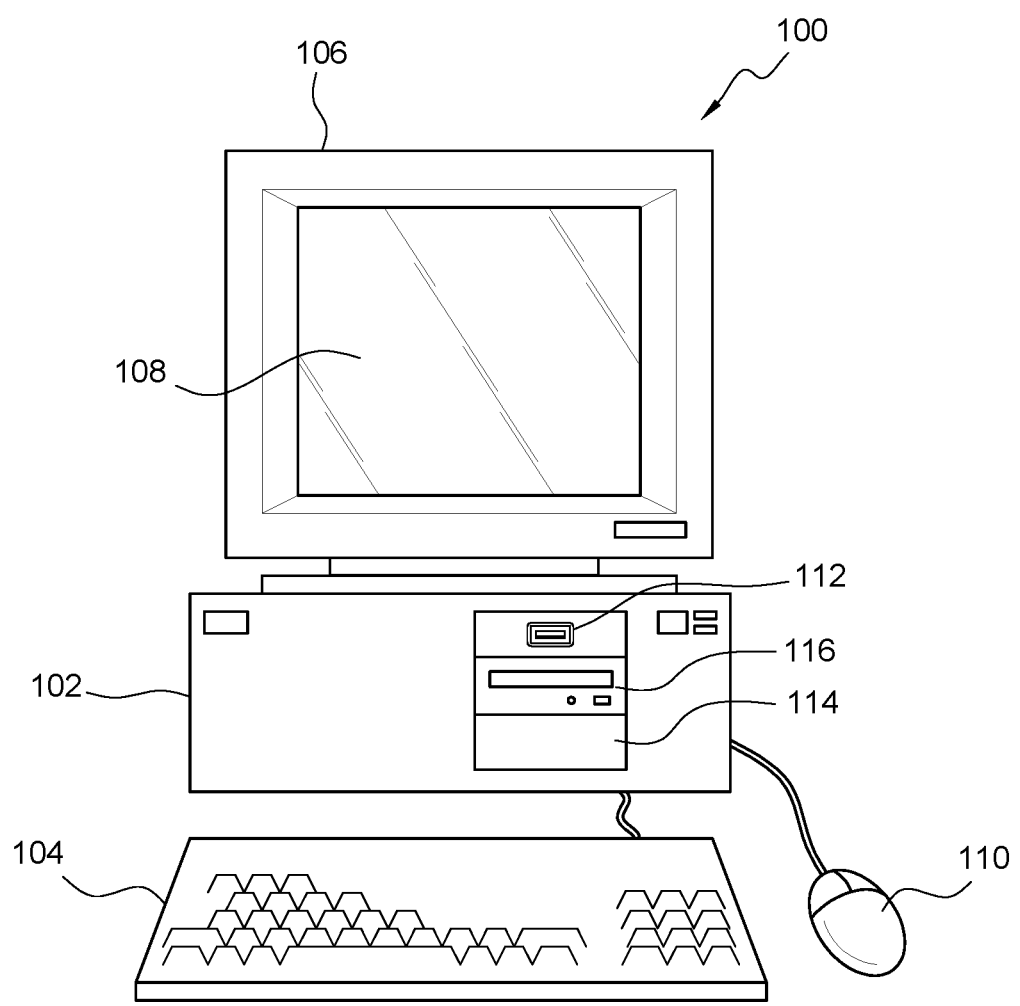
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform the act of defining a domain specific language to extract structured values of one or more product attributes of a plurality of products from raw source values of a plurality of vendor data sheets received by an online retailer. The one or more storage modules can be further configured to run on the one or more processing modules and perform the act of extracting the structured values of the one or more product attributes from the raw source values of the plurality of vendor data sheets. The one or more storage modules can be further configured to run on the one or more processing modules and perform the act of obtaining a plurality of normalization rules for use on a webpage of the online retailer and also for transforming the structured values to final normalized values, the plurality of normalization rules based on the structured values of the one or more product attributes as extracted with the domain specific language. The one or more storage modules can be further configured to run on the one or more processing modules and perform the act of normalizing the structured values by adding the domain specific language to a runtime normalization process comprising the plurality of normalization rules to obtain the final normalized values for the structured values. The one or more storage modules can be further configured to run on the one or more processing modules and perform the act of persisting the final normalized values in a catalog of the online retailer. The one or more storage modules can be further configured to run on the one or more processing modules and perform the act of coordinating a first display of the final normalized values on a webpage of the online retailer on an electronic device of a user such that when one or more of the final normalized values are selected on the first display by the user of the online retailer, the plurality of products are automatically filtered on the webpage according to the one or more of the final normalized values as selected.

Various embodiments include a method. The method can include defining a domain specific language to extract structured values of one or more product attributes of a plurality of products from raw source values of a plurality of vendor data sheets received by an online retailer. The method can also include extracting the structured values of the one or more product attributes from the raw source values of the plurality of vendor data sheets. The method can also include obtaining a plurality of normalization rules for use on a webpage of the online retailer and also for transforming the structured values to final normalized values, the plurality of normalization rules based on the structured values of the one or more product attributes as extracted with the domain specific language. The method can also include normalizing the structured values by adding the domain specific language to a runtime normalization process comprising the plurality of normalization rules to obtain the final normalized values for the structured value. The method can also include persisting the final normalized values in a catalog of the online retailer. The method can also include coordinating a first display of the final normalized values on a webpage of the online retailer on an electronic device of a user such that when one or more of the final normalized values are selected on the first display by the user of the online retailer, the plurality of products are automatically filtered on the webpage according to the one or more of the final normalized values as selected.

A number of embodiments can include a system. The system can include one or more processing modules and one or more non-transitory storage modules storing computing instructions configured to run on the one or more processing modules. The one or more storage modules can be configured to run on the one or more processing modules and perform the act of extracting, with a domain specific language, structured values of one or more product attributes of a plurality of products from raw source values of a plurality of vendor data sheets received by an online retailer. The one or more storage modules can be further configured to run on the one or more processing modules and perform the act of obtaining a plurality of normalization rules for use on a webpage of the online retailer and also for transforming the structured values to final normalized values, the plurality of normalization rules based on the structured values of the one or more product attributes as extracted with the domain specific language. The one or more storage modules can be further configured to run on the one or more processing modules and perform the act of optimizing the domain specific language to reduce the number of a plurality of normalization rules used in a runtime normalization process. The one or more storage modules can be further configured to run on the one or more processing modules and perform the act of normalizing the structured values by adding the domain specific language to the runtime normalization process comprising the plurality of normalization rules to obtain the final normalized values for the structured values. The one or more storage modules can be configured to run on the one or more processing modules and perform the act of persisting the final normalized values in a catalog of the online retailer. The one or more storage modules can be further configured to run on the one or more processing modules and perform the act of coordinating a first display of the final normalized values on a webpage of the online retailer on an electronic device of a user such that when one or more of the final normalized values are selected on the first display by the user of the online retailer, the plurality of products are automatically filtered on the webpage according to the one or more of the final normalized values as selected.

A number of embodiments can include a system. The system can include one or more processing modules and one or more non-transitory storage modules storing computing instructions configured to run on the one or more processing modules. The one or more storage modules can be configured to run on the one or more processing modules and perform an act of extracting, with a domain specific language, structured values of one or more product attributes of a plurality of products from raw source values of a plurality of vendor data sheets received by an online retailer. The one or more storage modules also can be configured to run on the one or more processing modules and perform an act of obtaining a plurality of normalization rules for use on a webpage of the online retailer and also for transforming the structured values to final normalized values, the plurality of normalization rules based on the structured values of the one or more product attributes as extracted with the domain specific language. The one or more storage modules also can be configured to run on the one or more processing modules and perform an act of optimizing the domain specific language to reduce a number of the plurality of normalization rules used in a runtime normalization process. The one or more storage modules also can be configured to run on the one or more processing modules and perform an act of normalizing the structured values by adding the domain specific language to the runtime normalization process comprising the plurality of normalization rules to obtain the final normalized values for the structured values. The one or more storage modules also can be configured to run on the one or more processing modules and perform an act of using the plurality of normalization rules and a multi-class classification algorithm to train a classification model for the one or more product attributes of the plurality of products. The one or more storage modules also can be configured to run on the one or more processing modules and perform an act of determining additional normalization rules for transforming additional structured values to additional final normalized values based on a classification of additional raw source values with the classification model, the additional raw source values having not been normalized. The one or more storage modules also can be configured to run on the one or more processing modules and perform an act of validating the additional normalization rules. The one or more storage modules also can be configured to run on the one or more processing modules and perform an act of adding the additional normalization rules to the classification model if the additional normalization rules are validated. The one or more storage modules also can be configured to run on the one or more processing modules and perform an act of extracting, with the domain specific language, the additional structured values of the one or more product attributes of the plurality of products from the additional raw source values. The one or more storage modules also can be configured to run on the one or more processing modules and perform an act of normalizing the additional structured values by adding the domain specific language to the runtime normalization process comprising the plurality of normalization rules and also the additional normalization rules to obtain the additional final normalized values for the additional structured values. The one or more storage modules also can be configured to run on the one or more processing modules and perform an act of coordinating a display of the additional final normalized values on the webpage of the online retailer on an electronic device of a user such that when one or more of the additional final normalized values are selected on the display by the user of the online retailer, the plurality of products are automatically filtered on the webpage according to the one or more of the additional final normalized values.

A number of embodiments can include a method. The method can include extracting, with a domain specific language, structured values of one or more product attributes of a plurality of products from raw source values of a plurality of vendor data sheets received by an online retailer. The method also can include obtaining a plurality of normalization rules for use on a webpage of the online retailer and also for transforming the structured values to final normalized values, the plurality of normalization rules based on the structured values of the one or more product attributes as extracted with the domain specific language. The method also can include optimizing the domain specific language to reduce a number of the plurality of normalization rules used in a runtime normalization process. The method also can include normalizing the structured values by adding the domain specific language to the runtime normalization process comprising the plurality of normalization rules to obtain the final normalized values for the structured values. The method also can include using the plurality of normalization rules and a multi-class classification algorithm to train a classification model for the one or more product attributes of the plurality of products. The method also can include determining additional normalization rules for transforming additional structured values to additional final normalized values based on a classification of additional raw source values with the classification model, the additional raw source values having not been normalized. The method also can include validating the additional normalization rules. The method also can include adding the additional normalization rules to the classification model if the additional normalization rules are validated. The method also can include extracting, with the domain specific language, the additional structured values of the one or more product attributes of the plurality of products from the additional raw source values. The method also can include normalizing the additional structured values by adding the domain specific language to the runtime normalization process comprising the plurality of normalization rules and also the additional normalization rules to obtain the additional final normalized values for the additional structured values. The method also can include coordinating a display of the additional final normalized values on the webpage of the online retailer on an electronic device of a user such that when one or more of the additional final normalized values are selected on the display by the user of the online retailer, the plurality of products are automatically filtered on the webpage according to the one or more of the additional final normalized values.

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of normalization rules for use on a webpage of an online retailer and also for transforming structured values of one or more product attributes of a plurality of products extracted from raw source values of a plurality of vendor data sheets to final normalized values. The one or more storage modules also can be configured to run on the one or more processing modules and perform an act of using the plurality of normalization rules and a multi-class classification algorithm to train a classification model for the one or more product attributes of the plurality of products. The one or more storage modules also can be configured to run on the one or more processing modules and perform an act of determining additional normalization rules for transforming additional structured values to additional final normalized values based on a classification of additional raw source values with the classification model, the additional raw source values having not been normalized. The one or more storage modules also can be configured to run on the one or more processing modules and perform an act of validating the additional normalization rules. The one or more storage modules also can be configured to run on the one or more processing modules and perform an act of adding the additional normalization rules to the classification model if the additional normalization rules are validated. The one or more storage modules also can be configured to run on the one or more processing modules and perform an act of extracting, with a domain specific language, the additional structured values of the one or more product attributes of the plurality of products from the additional raw source values. The one or more storage modules also can be configured to run on the one or more processing modules and perform an act of normalizing the additional structured values by adding the domain specific language to the runtime normalization process comprising the plurality of normalization rules and also the additional normalization rules to obtain the additional final normalized values for the additional structured values. The one or more storage modules also can be configured to run on the one or more processing modules and perform an act of coordinating a display of the additional final normalized values on the webpage of the online retailer on an electronic device of a user such that when one or more of the additional final normalized values are selected on the display by the user of the online retailer, the plurality of products are automatically filtered on the webpage according to the one or more of the additional final normalized values.

Figure 2:
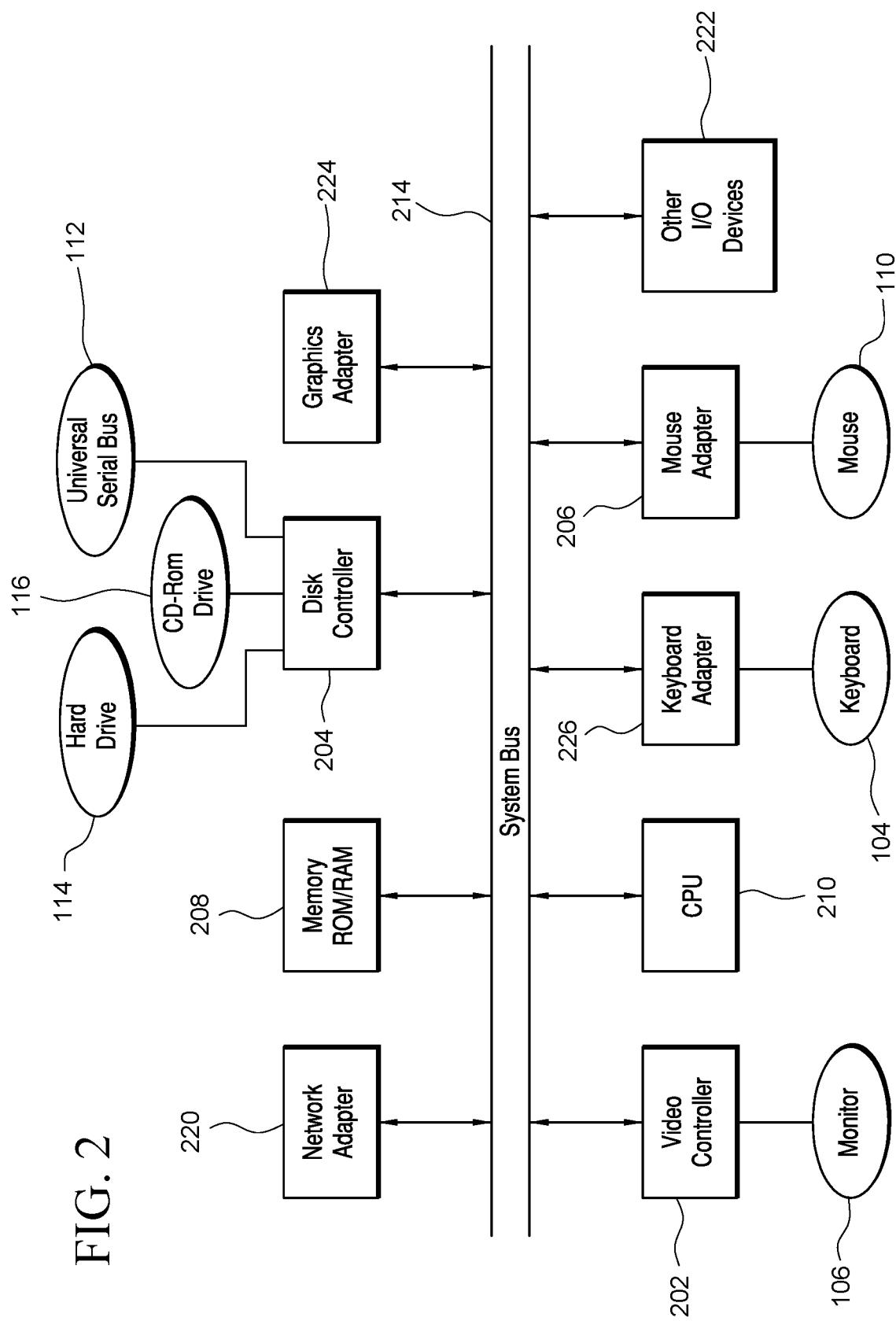
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
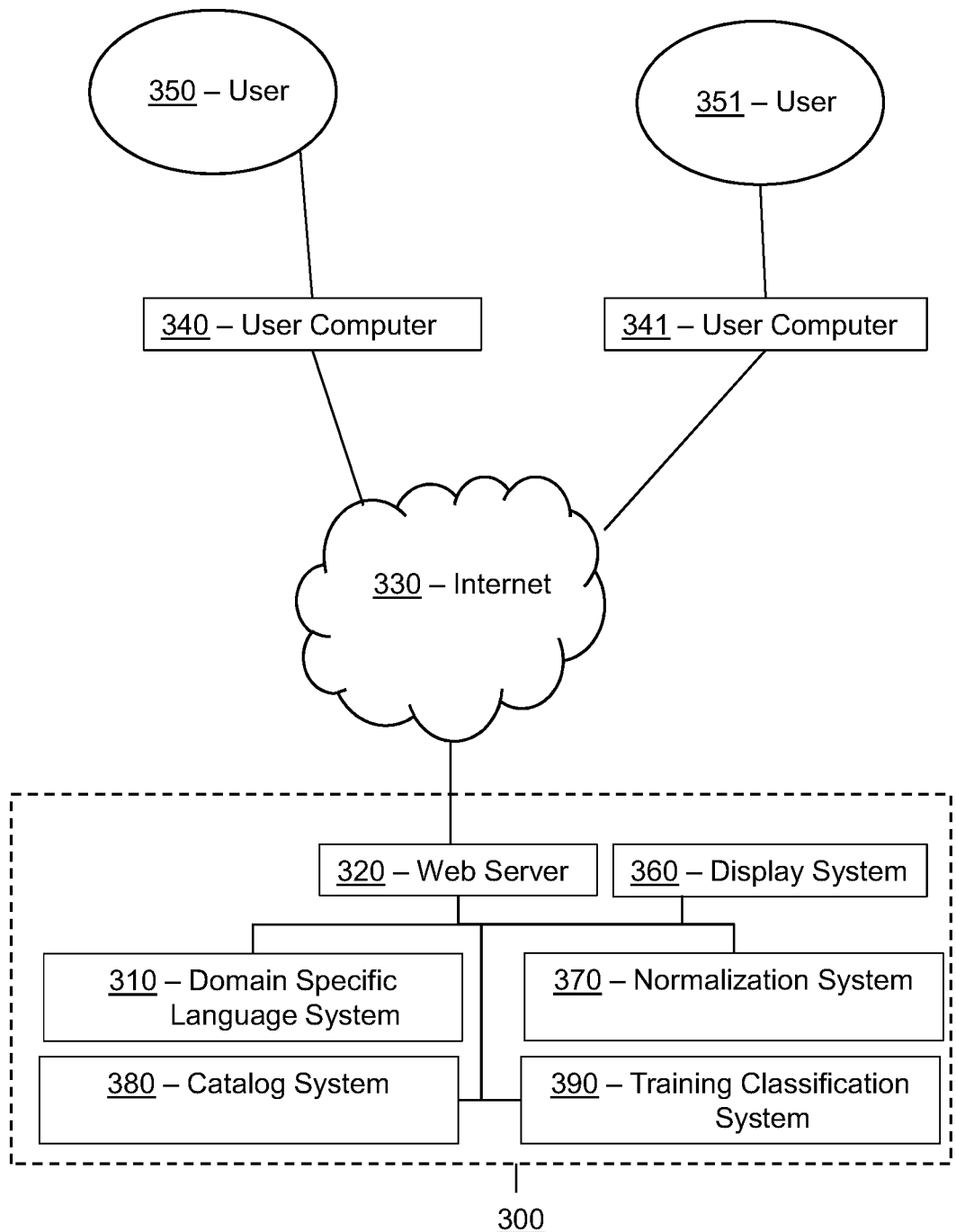
FIG. 3 illustrates a representative block diagram of a system, according to an embodiment.

Turning ahead in the drawings, FIG. 3 illustrates a block diagram of a system 300 that can be employed for optimizing normalization of product attributes for an online retailer as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a domain specific language system 310, a web server 320, a display system 360, a normalization system 370, a catalog system 380, and/or a training classification system 390. Domain specific language system 310, web server 320, display system 360, normalization system 370, catalog system 380, and/or training classification system 390 can each be a computer system, such as computer system 100 (FIG. 1), as described above, and can each be a single computer, a single server, or a cluster or collection of computers or servers, or a cloud of computers or servers. In another embodiment, a single computer system can host each of two or more of domain specific language system 310, web server 320, display system 360, normalization system 370, catalog system 380, and/or training classification system 390. Additional details regarding domain specific language system 310, web server 320, display system 360, normalization system 370, catalog system 380, and training classification system 390 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, domain specific language system 310, web server 320, display system 360, normalization system 370, catalog system 380, and/or training classification system 390 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) domain specific language system 310, web server 320, display system 360, normalization system 370, catalog system 380, and/or training classification system 390 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of domain specific language system 310, web server 320, display system 360, normalization system 370, catalog system 380, and/or training classification system 390. In a similar manner, the processing module(s) and the memory storage module(s) can be local and/or remote to each other.

In many embodiments, domain specific language system 310, web server 320, display system 360, normalization system 370, catalog system 380, and/or training classification system 390 can be configured to communicate with one or more user computers 340 and 341. In some embodiments, user computers 340 and 341 also can be referred to as customer computers. In some embodiments, domain specific language system 310, web server 320, display system 360, normalization system 370, catalog system 380, and/or training classification system 390 can communicate or interface (e.g., interact) with one or more customer computers (such as user computers 340 and 341) through a network or internet 330. Internet 330 can be an intranet that is not open to the public. Accordingly, in many embodiments, domain specific language system 310, web server 320, display system 360, normalization system 370, catalog system 380, and/or training classification system 390 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, domain specific language system 310, web server 320, display system 360, normalization system 370, catalog system 380, and/or training classification system 390 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between domain specific language system 310, web server 320, display system 360, normalization system 370, catalog system 380, and/or training classification system 390, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 5:
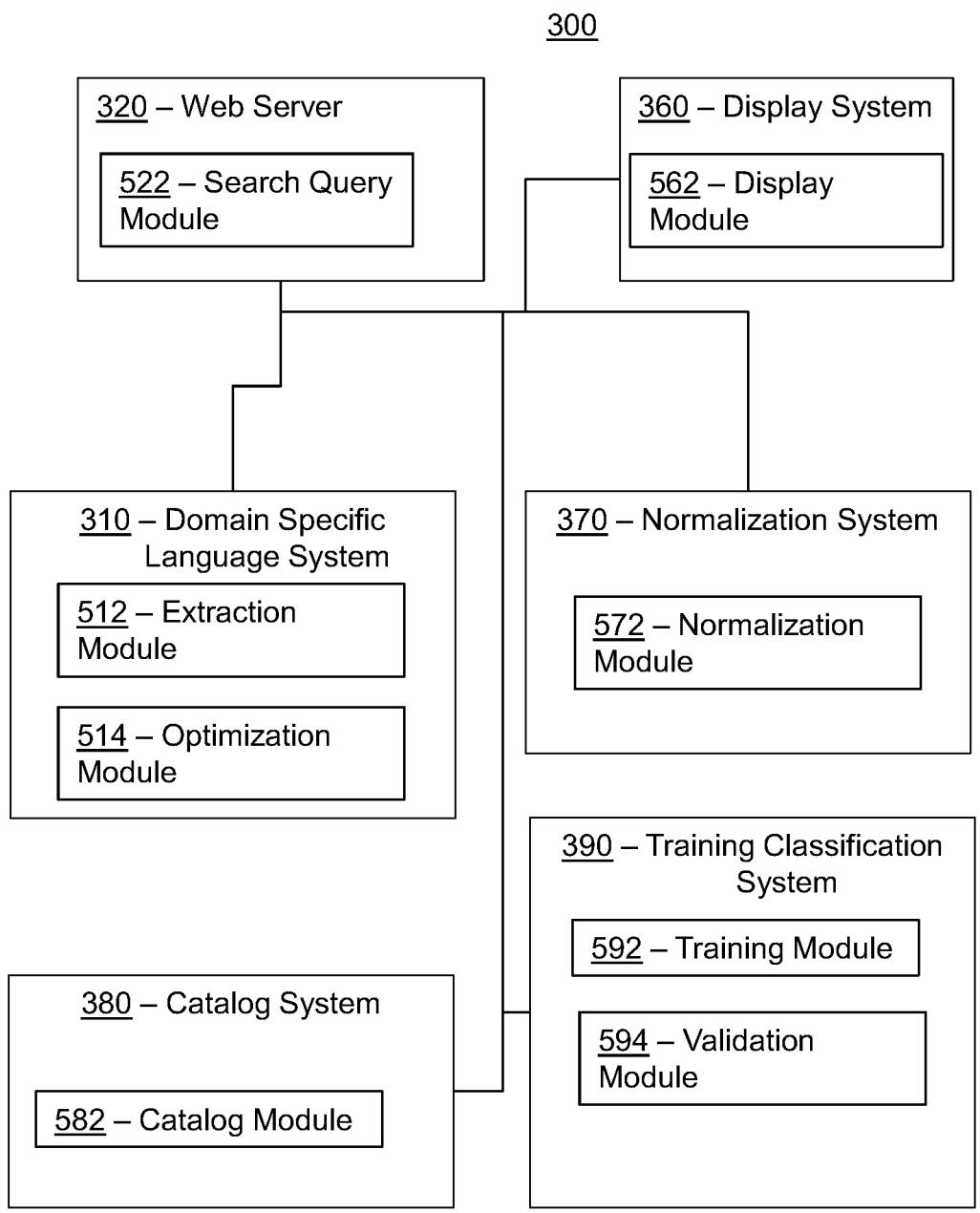
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 514, 522, 562, 572, 582, 592, and/or 594 (FIG. 5). Such non-transitory memory storage modules can be part of a computer system such as domain specific language system 310, web server 320, display system 360, normalization system 370, catalog system 380, and/or training classification system 390 (FIGS. 3 and 5). The processing module(s) can be similar or identical to the processing module(s) described above with respect to computer system 100 (FIG. 1).

Application of conventional normalization rules to source data in conventional systems often results in inconsistent and/or incorrect values. For example, application of a first normalization rule to a rug size expressed as "57L×95W in." can result in a value of 5'×8', and application of a second normalization rule to a rug size expressed case "4'9"×7'11"" can result in a value of 5'×7'. Therefore, two un-normalized values, expressed differently but actually equal in dimension, can result in different sizes based on the normalization rules. Embodiments of method 400 can transform raw source values from numerous vendors into discreet values that improve efficiency and speed of the overall system. To accomplish this, some embodiments can optimize domain specific language to reduce the number of normalization rules and also add the domain specific language to the normalization process. For example, when a vendor's source raw data reaches the catalog of an online retailer, the domain specific language can first extract the structured values, followed by a normalization rule engine that can match the structured values against all the rules before final normalized values are persisted in the catalog.

Furthermore, conventionally, data fields are cleaned up manually in a process that is not scalable. For example, a rug size and shape attribute may need over 2,000 human-created rules based on an existing data set, and with new data may need another 800 new human-created rules. In some embodiments of method 400, a context specific domain model can be used for each product attribute of a product to clean up data fields rather than a conventional general purposes approach. Additionally, application of method 400 can reduce the number of rules and optimize efficiency and speed of the systems used in method 400.

Method 400 can comprise an activity 405 of defining a domain specific language to extract structured values of one or more product attributes of a plurality of products from raw source values of a plurality of vendor data sheets received by an online retailer. In some embodiments, the domain specific language can comprise internal domain specific language. In other embodiments, the domain specific language can comprise external domain specific language. More particularly, parser combinators such as but not limited to scala parser combinators can be used in defining a domain specific language to extract structured values of one or more product attributes of a product from raw source values of a plurality of vendor data sheets received by an online retailer. According to some aspects, a parser can be built for each product attribute of the one or more product attributes. More particularly, the parser can comprise a delimiter that is not limited to a percentage or a component value. For example, the parser can recognize the defining of a percentage followed by a component, or vice versa. In some embodiments, the domain specific language can comprise a parser having two definitions in a single line. For example, a t-shirt can comprise two different portions with different material combinations. Thus, the domain specific language is advantageous to conventional systems, amongst other reasons, because the delimiter can be very powerful relative to conventional systems. The domain specific language can be configured to define an expression of the raw source values, parse the expression of the raw source values, and make the expression of the raw source values into the structured values.

By way of non-limiting example, structured values can be extracted as <extracted structured value>||<final normalized value>||<target shelf>:

For Fabric Material:
  10% cotton, 85% polyester, 5% spandex||Cotton Blend-||Baby & Toddler Pants
  10% linen, 90% polyester||Linen Blend||Juniors Shirts & Blouses
  100% acrylic faux fur||Faux Fur||Juniors Sweaters & Cardigans
  12% acrylic, 3% cotton, 8% nylon, 26% polyester, 3% rayon, 48% wool||Wool Blend||Hats & Headwear
  22% nylon, 48% polyester, 26% rayon, 4% spandex||Polyester||Women's Pants
  31% coolmax cotton, 32% coolmax polyester, 2% lycra spandex, 4% nylon, 31% polyester||Cotton Blend-||Socks & Hosiery For Rug Size:
  3' Cross Sewn Square||2' to 5' Round/Square||Global
  2'×3' Scatter/Novelty Shape||2'×3'||Global
  5'×8' Vertical Stripe||5'×8'||Global
  9'6" Concentric Square||Over 9' Round/Square||Global In one or more embodiments, the structured values of the one or more product attributes can comprise dimensions of the one or more products, shape of the one or more products, versions of the one or more products, contents of the one or more products, and/or a percentage of the contents of each product of the plurality of products. For example, in the non-limiting example of a t-shirt, the structured values could comprise cotton and polyester as the contents of the t-shirt, and 50% cotton and 50% polyester as the percentage of the contents of the t-shirt. As illustrated in this example, in some embodiments, the structured values can comprise a numeric value, a word or phrase, and/or both. Furthermore, it is contemplated that numerous products attributes not listed here can be considered, and that product attributes have some inherent structure that can be converted and/or utilized as a structured value for the purposes of this disclosure. In one or more embodiments, raw source values of a plurality of vendor data sheets can comprise the values and/or descriptions of a product as provided to the online retailer on data sheets from one or more vendors, suppliers, merchandisers, and the like.

Method 400 can further comprise an activity 410 of extracting the structured values of the one or more product attributes from the raw source values of the plurality of vendor data sheets. Extracting the structured source values can comprise, by way of non-limiting example, extracting the dimensions of the one or more products, shape of the one or more products, versions of the one or more products, contents of the one or more products, and/or a percentage of the contents of the products from the raw source values of the plurality of vendor data sheets as described in greater detail above. Thus, activity 410 can parse the raw source values into structured values of contents and percentages of contents. This process can clean up what is otherwise known as dirty data that lacks consistent structured values.

Method 400 can further comprise an activity 415 of obtaining a plurality of normalization rules for use on a webpage of the online retailer and also for transforming the structured values to final normalized values. More particularly, activity 415 can comprise obtaining a plurality of normalization rules for transforming the structured values to final normalized values. The plurality of normalization rules can be based on the structured values of the one or more product attributes as extracted with the domain specific language. In embodiments of a normalization process, source data is transformed to normalized values by a rule engine that matches values against predefined regular expressions. These predefined regular expressions can be referred to as the normalization rules.

Method 400 can optionally comprise an activity 420 of optimizing the domain specific language to reduce a number of the normalization rules. More particularly, activity 420 can comprise optimizing the domain specific language to reduce a number of the plurality of normalization rules used in the runtime normalization process. In some circumstances, after extracting the structured values of the product attributes and obtaining a plurality of normalization rules, a system is left with thousands of rules and combinations. In operation, optimizing the domain specific language to reduce the number of normalization rules is beneficial to the overall operation of the system because a reduced number of rules results in easier application of the rules during the runtime process. Accordingly, at runtime, the process is much faster and more efficient.

In more particular embodiments, optimizing the domain specific language to reduce the number of the plurality of normalization rules used in the runtime normalization process can comprise collapsing similar normalization rules of the plurality of normalization rules. For example, a product may include a dominant content or component, such as a t-shirt made of 90% cotton. In this example, content of the remaining 10% of the t-shirt may be irrelevant, so the system can be configured to collapse rules defining the remaining 10% into a single rule of 90% cotton and 10% other material. Alternatively or additionally, optimizing the domain specific language to reduce the number of the plurality of normalization rules used in the runtime normalization process can comprise using domain knowledge to guide generation of one or more normalization rules of the plurality of normalization rules. For example, based on business knowledge of the particular domain attributes, a user can eliminate rules that are unnecessary or inefficient.

Method 400 can further comprise an activity 425 of normalizing the structured values by adding the domain specific language to a runtime normalization process. More particularly, activity 425 can comprise normalizing the structured values by adding the domain specific language to a runtime normalization process comprising the plurality of normalization rules to obtain the final normalized values for the structured values. In some embodiments, activity 425 can optionally comprise adding the domain specific language to the runtime normalization process to parse the raw source values into the structured values and matching the structured values against the plurality of normalization rules.

Method 400 can further comprise an activity 430 of persisting the final normalized values in a catalog of the online retailer. Final normalized values persisted in the catalog of the online retailer can be then be utilized for reference by the online retailer.

Method 400 can optionally further comprise an activity 432 of coordinating a first display of the final normalized values on a webpage of the online retailer on an electronic device of the user. More particularly, activity 432 can comprise coordinating the first display of the final normalized values on the webpage of the online retailer on the electronic device of the user such that when one or more of the final normalized values are selected on the display by the user of the online retailer, the plurality of products are automatically filtered on the webpage according to the one or more of the final normalized values as selected.

Turning to FIGS. 6A and 6B, FIG. 6B shows a non-limiting example of an advantage of a display of the final normalized values according to this disclosure. As shown in FIG. 6A, conventional systems and methods result in a display on a webpage of excessive and sometimes duplicative values from raw source values of vendor data sheets. The number of values displayed to the user can be cumbersome and confusing to the user. FIG. 6B, in contrast, shows a non-limiting example of a display of the final normalized values as normalized according to the activities described herein. The limited and clean number of values is advantageous to a customer desiring to filter results, such as filtering t-shirts by material. When a user selects one of the final normalized values shown in FIG. 6B, the plurality of products are filtered according to the final normalized value as selected. For example, if a user selects "Cotton Blend" on from the display shown in FIG. 6B, only cotton blend t-shirts would be displayed. In contrast, the values according to conventional extraction methods shown in the display of FIG. 6A would require a user to select "Cotton Blend," "1% Cotton, "38% Cotton," "50% COTTON," "50% Cotton," "53% Cotton," "60% Cotton," "60% Cotton/40% Polyester," and "Cotton/Poly Blend" to achieve the same result as selected only "Cotton Blend" in FIG. 6B.

Returning to FIG. 4, method 400 can optionally comprise an activity 435 of receiving an online search query entered by a user of the online retailer. The online search query can comprise one or more terms or phrases associated with a product or product attributes of the product.

Method 400 also can optionally comprise an activity 440 of determining additional products of the plurality of products for display on an electronic device of the user in response to the online search query by extracting additional structured values from the online search query using the domain specific language and normalizing the additional structured values by adding the domain specific language to an additional runtime normalization process. According to some embodiments, the one or more products for display on the electronic device of the user in response to the online search query can be determined by extracting additional structured values from the online search query using the domain specific language, and also normalizing the additional structured values by adding the domain specific language to an additional runtime normalization process to obtain additional final normalized values for the additional structured values. The additional runtime normalization process can comprise the plurality of normalization rules. For example, if a user search query included 50% cotton t-shirt or some other semantically equivalent term, the system can be configured to use the domain specific language to infer the product type and the specific fabric material in question.

Method 400 also can optionally comprise an activity 445 of coordinating a second display on the electronic device of the user of the online retailer. The display can comprise the additional products, as determined. For example, if a user entered 50% cotton t-shirt, the second display on the electronic device of the user can display one or more t-shirts as determined by extracting additional structured values from the online search query using the domain specific language, and normalizing the additional structured values. The display can comprise photos, product information, and the like.

It is often beneficial and/or necessary for normalization rules to change or evolve over time as source values and/or target values change. By way of a non-limiting example, analysts often need a month or more to develop an initial set of over two-thousand normalization rules. To keep these normalization rules up-to-date, even more person-hours than the initial month or more of work would be required. To solve this problem, an automated and scalable approach was developed. In general, the initial set of normalization rules, as described above, can be treated as training data, and different supervised-learning algorithms can be used to build classification models specific for each product attribute. Supervised-learning algorithms can include but are not limited to logistic regression, decision trees, random forests, and/or naïve Bayes. When additional normalization rules are added after validation of the additional normalization rules, as described in greater detail below, the classification models can be refreshed on a regular basis. The classification model can be used to predict a category for additional input. The cycle of training a model, using the model to suggest new additional normalization rules, and validating the new additional normalization rules can be continuous. The result of this cycle is a continuously evolving normalization rule suggestion engine that will keep up with the changing raw source values and target data.

Figure 7:
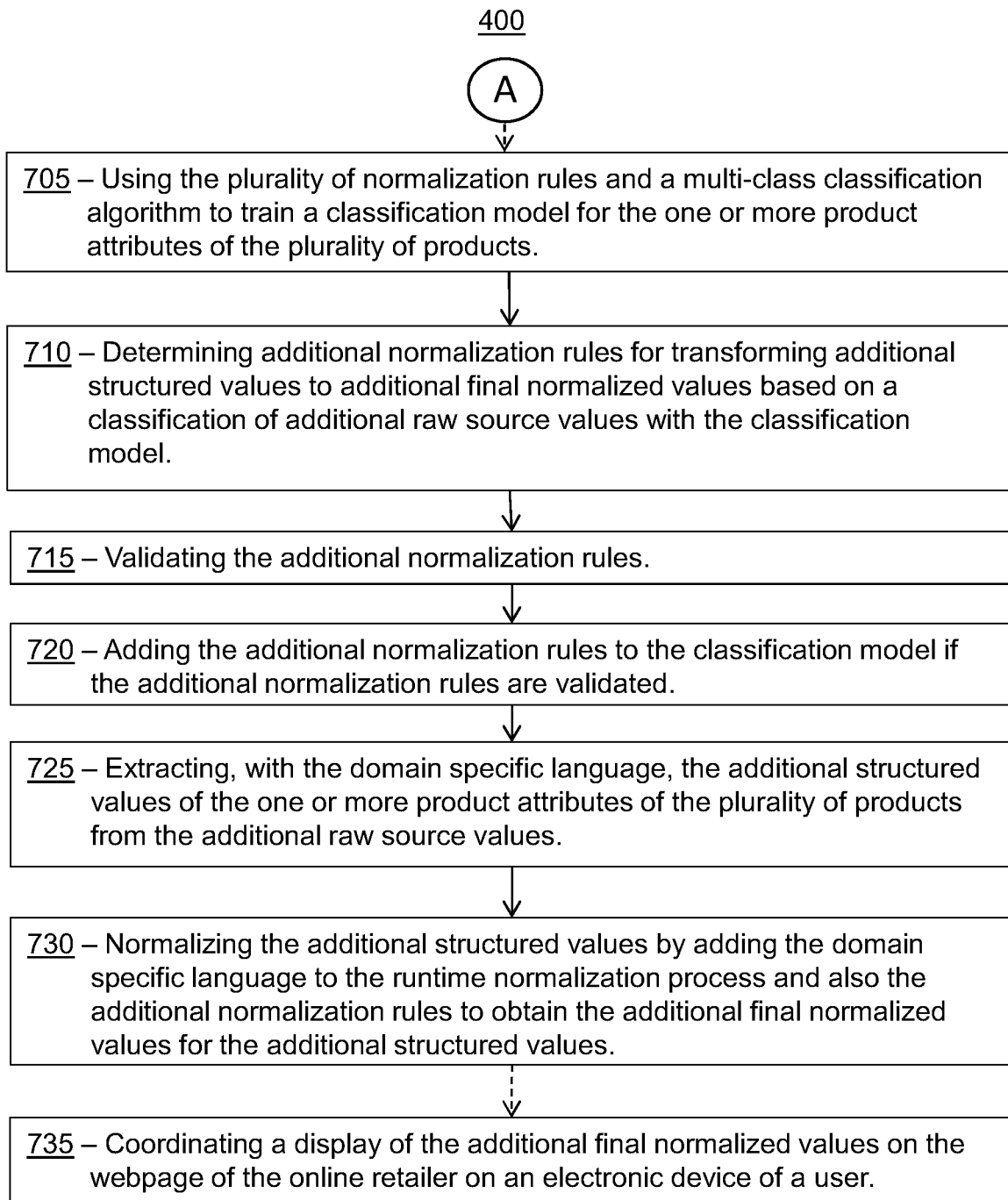
FIG. 7 is a second flowchart for a method, according to certain embodiments.

Turning ahead in the drawings to FIG. 7, method 400 can optionally further comprise several activities between activities 430 and 432 (FIG. 4). For example, a first activity between activities 430 and 432 (FIG. 4) can be an activity 705 of using the plurality of normalization rules and a multi-class classification algorithm to train a classification model for the one or more product attributes of the plurality of products. More particularly, activity 705 of using the plurality of normalization rules and a multi-class classification algorithm to train a classification model for the one or more product attributes of the plurality of products can comprise an activity of training the classification model for the one or more product attributes of the plurality of products by creating a resilient distributed dataset using training data, the training data comprising (1) input represented as vectors of the one or more product attributes and (2) output represented as a predefined label. A predefined label can be final normalized values, such as "cotton blend" for fabric material, or "2'×3'" for rug size.

In some embodiments, multi-class classification can utilize multinomial logistic regression using a limited-memory Broyden-Fletcher-Goldfarb-Shanno (BFGS) algorithm with standard feature scaling and L2 regularization. A classification-based approach can be advantageous for product attributes such as products sizes, which have distinct and inherent value structures. In some embodiments, implementation of attribute-specific classifiers can be based on logistic regression with BFGS. Each classifier can be customized to use attribute-specific features. For example, for a rug size classifier, dimensions such as length by width can be extracted, as well as any other descriptors such as shape, type, and the like (oval, cross-sewn, runner, etc.). Continuing with a rug example, model training can use the following features: length (L), width (W), aspect ratio (L/W), area (L*W), and diagonal ($\sqrt{L^2+W^2}$). Existing normalization rules for rug size can then be split into a training set and a testing set.

Method 400 can optionally further comprise an activity 710 of determining additional normalization rules for transforming additional structured values to additional final normalized values based on a classification of additional raw source values with the classification model. In some embodiments, the additional raw source values have not been normalized before determining the additional normalization rules for transforming additional structured values to the additional final normalized values based on the classification of the additional raw source values with the classification model. More specifically, using a domain specific language in combination with the classification model, all un-normalized raw source values can be classified. Based on the classification results, new additional normalization rules can be suggested. For example, all un-normalized raw rug size values can be classified on a daily basis using the domain specific language in combination with the classification model. In some embodiments, resilient distributed dataset-based machine learning can be used in determining additional normalization rules for transforming additional structured values to additional final normalized values based on a classification of additional raw source values with the classification model.

In some embodiments, after activity 705 and before an activity 715, method 400 also optionally can comprise an activity of optimizing the domain specific language to reduce a number of the additional normalization rules that also can be used in the runtime normalization process. For example, the number of the additional normalization rules can be reduced by (1) collapsing similar normalization rules of the additional normalization rules, and/or (2) using domain knowledge to guide generation of one or more normalization rules of the additional normalization rules.

Moreover, also after activity 705 and before activity 715, method 400 also optionally can comprise an activity of evaluating precision of the classification model in some embodiments. More particularly, precision of the classification model can be evaluated by predicting further final normalized values of a test data set, and comparing the further final normalized values of the test data set with true final normalized values of the test data set. A training set also can be applied to a machine learning model as described above to update the classification model.

In some embodiments, similarity-based clustering can be used to cluster texts based upon similarity. For example, the raw source values can comprise textual data. In these and other embodiments, the additional normalization rules based on the classification of the raw source values with the classification model can comprise additional normalization rules based on the classification of the textual data of the raw source values as similar between source-source or source-target data. This clustering approach can be used to find synonyms when near-duplicate text is introduced into the raw source data. Method 400 can then, in some embodiments, optionally comprise an activity of analyzing the textual data of the raw source values with a locale-specific text analyzer. More specifically, a locale-specific text analyzer from a text search engine library and an open natural language processing tokenizer can be used for basic text stemming and stop words.

A challenge in some systems is to determining the nearest-neighbor search in the term space, given an attribute source and target values. Accordingly, after activity 705 and before activity 715, method 400 optionally can further comprise an activity of determining a min-wise independent permutations locality sensitive hashing scheme (MinHash) signature function for the plurality of normalization rules. For example, a MinHash signature function can be based upon a MurmurHash 64 bit algorithm. Using existing normalization rules as a baseline, MinHash signatures for the normalization rules can be computed. Method 400 can optionally further comprise determining a nearest match of a normalized value for each un-normalized value of the textual data of the raw source values. For similarity comparison, one or more of the following can be utilized: Jaccard distance, Levenshtein distance, and/or text similarity scores.

Next, method 400 optionally can further comprise activity 715 of validating the additional normalization rules. In some embodiments, the additional normalization rules can be initially validated by domain experts. As the classification model uses more and more normalization rules as training data, however, the test set also can be used to validate additional normalization rules by comparing the normalized values and the true values. Then, method 400 optionally can further comprise an activity 720 of adding the additional normalization rules to the classification model if the additional normalization rules are validated.

Subsequently, method 400 optionally can further comprise an activity 725 of extracting, with the domain specific language, the additional structured values of the one or more product attributes of the plurality of products from the additional raw source values. Extracting the additional structured source values can comprise, by way of non-limiting example, extracting the dimensions of the one or more products, shape of the one or more products, versions of the one or more products, contents of the one or more products, and/or a percentage of the contents of the products from the raw source values of the plurality of vendor data sheets as described in greater detail above. Thus, activity 725 can parse the additional raw source values into structured values of contents and percentages of contents. This process can clean up what is otherwise known as dirty data that lacks consistent structured values.

Method 400 optionally can further comprise an activity 730 of normalizing the additional structured values by adding the domain specific language to the runtime normalization process and also the additional normalization rules to obtain the additional final normalized values for the additional structured values. Normalizing the additional structured values can be similar to normalizing the structured values, as described above.

Method 400 optionally can further comprise an activity 735 of coordinating a display of the additional final normalized values on the webpage of the online retailer on an electronic device of a user. More particularly, activity 735 can comprise coordinating a display of the additional final normalized values on the webpage of the online retailer on an electronic device of a user such that when one or more of the additional final normalized values are selected on the display by the user of the online retailer, the plurality of products are automatically filtered on the webpage according to the one or more of the additional final normalized values. Coordinating a display of the additional final normalized values on the webpage of the online retailer can be similar to coordinating a display of the final normalized values on the webpage of the online retailer, as described above.

FIG. 5 illustrates a block diagram of a portion of system 300 comprising domain specific language system 310, web server 320, display system 360, normalization system 370, catalog system 380, and training classification system 390 according to the embodiment shown in FIG. 3. Each of domain specific language system 310, web server 320, display system 360, normalization system 370, catalog system 380, and/or training classification system 390 is merely exemplary and not limited to the embodiments presented herein. Each of domain specific language system 310, web server 320, display system 360, normalization system 370, catalog system 380, and/or training classification system 390 can be employed in many different embodiments or examples not specifically depicted or described herein. In some embodiments, certain elements or modules of domain specific language system 310, web server 320, display system 360, normalization system 370, catalog system 380, and/or training classification system 390 can perform various procedures, processes, and/or acts. In other embodiments, the procedures, processes, and/or acts can be performed by other suitable elements or modules.

In many embodiments, domain specific language system 310 can comprise non-transitory memory storage modules 512 and 514, web server 320 can comprise non-transitory memory storage module 522, display system 360 can comprise non-transitory memory storage module 562, normalization system 370 can comprise non-transitory memory storage module 572, catalog system 380 can comprise non-transitory memory storage module 582, and training classification system 390 can comprise non-transitory memory storage modules 592 and 594. Memory storage module 512 can be referred to as extraction module 512, memory storage module 514 can be referred to as optimization module 514, memory storage module 522 can be referred to as search query module 522, memory storage module 562 and be referred to display module 562, memory storage module 572 can be referred to as normalization module 572, memory storage module 582 can be referred to as catalog module 582, memory storage module 592 can be referred to as training module 592, and memory storage module 594 can be referred to as validation module 594.

In many embodiments, memory storage module 512 can store computing instructions configured to run on one or more processing modules and perform one or more acts of methods 400 (FIGS. 4 & 7) (e.g., activity 405 of defining a domain specific language to extract structured values of one or more product attributes of a product from raw source values of a plurality of vendor data sheets received by an online retailer, activity 410 of extracting the structured values of the one or more product attributes from the raw source values of the plurality of vendor data sheets (FIG. 4), activity 440 of determining one or more products for display on an electronic device of the user in response to the online search query by extracting additional structured values from the online search query using the domain specific language and normalizing the additional structured values by adding the domain specific language to an additional runtime normalization process (FIG. 4), and activity 725 of extracting, with the domain specific language, the additional structured values of the one or more product attributes of the plurality of products from the additional raw source values (FIG. 7)). Returning to FIG. 5, in many embodiments, memory storage module 514 can store computing instructions configured to run on one or more processing modules and perform one or more acts of methods 400 (FIGS. 4 & 7) (e.g., activity 420 of optimizing the domain specific language to reduce a number of the normalization rules (FIG. 4)).

Returning to FIG. 5, in many embodiments, memory storage module 572 can store computing instructions configured to run on one or more processing modules and perform one or more acts of methods 400 (FIGS. 4 & 7) (e.g., activity 415 of obtaining a plurality of normalization rules for transforming the structured values to final normalized values (FIG. 4), activity 425 of normalizing the structured values by adding the domain specific language to a runtime normalization process (FIG. 4), and activity 730 of normalizing the additional structured values by adding the domain specific language to the runtime normalization process and also the additional normalization rules to obtain the additional final normalized values for the additional structured values (FIG. 7)). Returning to FIG. 5, in many embodiments, memory storage module 582 can store computing instructions configured to run on one or more processing modules and perform one or more acts of methods 400 (FIG. 4) (e.g., activity 430 of persisting the final normalized values in a catalog of the online retailer (FIG. 4)). Returning to FIG. 5, in many embodiments, memory storage module 522 can store computing instructions configured to run on one or more processing modules and perform one or more acts of methods 400 (FIGS. 4 & 7) (e.g., activity 435 of receiving an online search query entered by a user of the online retailer (FIG. 4)). Returning to FIG. 5, in many embodiments, memory storage module 562 can store computing instructions configured to run on one or more processing modules and perform one or more acts of methods 400 (FIGS. 4 & 7) (e.g., activity 445 of coordinating a display on the electronic device of the user of the online retailer, the display comprising the one or more products as determined (FIG. 4), and activity 735 of coordinating a display of the additional final normalized values on the webpage of the online retailer on an electronic device of a user (FIG. 7)).

Returning to FIG. 5, in many embodiments, memory storage module 592 can store computing instructions configured to run on one or more processing modules and perform one or more acts of methods 400 (FIGS. 4 & 7) (e.g., activity 705 of using the plurality of normalization rules and a multi-class classification algorithm to train a classification model for the one or more product attributes of the plurality of products (FIG. 7), activity 710 of determining additional normalization rules for transforming additional structure values to additional final normalized values based on a classification of additional raw source values with the classification model (FIG. 7), and activity 720 of adding the additional normalization rules to the classification model if the additional normalization rules are validated (FIG. 7)). Returning to FIG. 5, in many embodiments, memory storage module 594 can store computing instructions configured to run on one or more processing modules and perform on or more acts of method 400 (FIGS. 4 & 7) (e.g., activity 715 of validating the additional normalization rules (FIG. 7)).

Although systems and methods for optimizing normalization of product attributes for an online retailer have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory storage devices storing computing instructions configured to run on the one or more processors and perform acts of:
      extracting, with a domain specific language and the one or more processors, one or more respective structured values of one or more respective product attributes of one or more products of a plurality of products from one or more respective raw source values of one or more vendor data sheets of a plurality of vendor data sheets received by an online retailer;
      obtaining, with the one or more processors, a plurality of normalization rules for:
         use on a webpage of the online retailer; and
         transforming the one or more respective structured values to one or more respective final normalized values, the plurality of normalization rules based on the one or more respective structured values of the one or more respective product attributes, as extracted with the domain specific language;
      extracting, with the one or more processors, one or more respective irrelevant values of the one or more respective structured values of the one or more respective product attributes from the one or more respective structured values of the one or more respective product attributes;
      optimizing, with the one or more processors, the domain specific language by collapsing rules for transforming the one or more respective irrelevant values of the one or more respective structured values of the one or more respective product attributes to the one or more respective final normalized values, thereby reducing a number of the plurality of normalization rules used in a runtime normalization process;
      normalizing, with the one or more processors, the one or more respective structured values by adding the domain specific language to the runtime normalization process comprising the plurality of normalization rules, as reduced, to obtain the one or more respective final normalized values for the one or more respective structured values;
      using, with the one or more processors, the plurality of normalization rules, as reduced, and a multi-class classification algorithm to train a classification model for the one or more respective product attributes of the plurality of products;
      determining, with the one or more processors, additional normalization rules for transforming additional respective structured values to additional respective final normalized values based on a classification of additional respective raw source values with the classification model, the additional respective raw source values having not been normalized;
      validating, with the one or more processors, the additional normalization rules;
      adding, with the one or more processors, the additional normalization rules to the classification model after the additional normalization rules are validated;
      extracting, with the domain specific language and the one or more processors, the additional respective structured values of the one or more respective product attributes of the plurality of products from the additional respective raw source values;
      normalizing, with the one or more processors, the additional respective structured values by adding the domain specific language to the runtime normalization process comprising the plurality of normalization rules, as reduced, and also the additional normalization rules to obtain the additional respective final normalized values for the additional respective structured values; and
      coordinating, with the one or more processors, a display of the additional respective final normalized values on the webpage of the online retailer on an electronic device of a user such that, when one or more of the additional respective final normalized values are selected on the display by the user, the plurality of products are automatically filtered on the webpage according to the one or more of the additional respective final normalized values of the additional respective final normalized values.

2. The system of claim 1, wherein the one or more non-transitory storage devices storing the computing instructions are configured to run on the one or more processors and perform an act of evaluating a precision of the classification model by:
   predicting further final normalized values of a test data set; and comparing one or more further respective final normalized values of the further final normalized values of the test data set with one or more true final normalized values of the test data set.

3. The system of claim 1, wherein using the plurality of normalization rules, as reduced, and the multi-class classification algorithm comprises:
training the classification model for the one or more respective product attributes of the plurality of products by creating a resilient distributed dataset using training data, the training data comprising (1) input represented as vectors of the one or more respective product attributes and (2) output represented as a predefined label.

4. The system of claim 1, wherein optimizing the domain specific language comprises:
(1) collapsing similar normalization rules of the plurality of normalization rules; or
(2) using domain knowledge to guide generation of one or more normalization rules of the plurality of normalization rules.

5. The system of claim 1, wherein adding the domain specific language to the runtime normalization process comprises matching the one or more respective structured values, as extracted, against the plurality of normalization rules, as reduced.

6. The system of claim 1, wherein:
the one or more non-transitory storage devices storing the computing instructions are configured to run on the one or more processors and perform an act of evaluating a precision of the classification model by:
predicting further final normalized values of a test data set; and
comparing one or more further respective final normalized values of the further final normalized values of the test data set with one or more true final normalized values of the test data set;
using the plurality of normalization rules, as reduced, and the multi-class classification algorithm comprises:
training the classification model for the one or more respective product attributes of the plurality of products by creating a resilient distributed dataset using training data, the training data comprising (1) input represented as vectors of the one or more respective product attributes and (2) output represented as a predefined label;
optimizing the domain specific language comprises:
(1) collapsing similar normalization rules of the plurality of normalization rules; or
(2) using domain knowledge to guide generation of one or more normalization rules of the plurality of normalization rules; and
adding the domain specific language to the runtime normalization process comprises matching the one or more respective structured values as extracted against the plurality of normalization rules, as reduced.

7. A method comprising:
extracting, with a domain specific language and one or more processors, one or more respective structured values of one or more respective product attributes of one or more products of a plurality of products from one or more respective raw source values of one or more vendor data sheets of a plurality of vendor data sheets received by an online retailer;
obtaining, with the one or more processors, a plurality of normalization rules for:
use on a webpage of the online retailer; and
transforming the one or more respective structured values to one or more respective final normalized values, the plurality of normalization rules based on the one or more respective structured values of the one or more respective product attributes, as extracted with the domain specific language;
extracting, with the one or more processors, one or more respective irrelevant values of the one or more respective structured values of the one or more respective product attributes from the one or more respective structured values of the one or more respective product attributes;
optimizing, with the one or more processors, the domain specific language by collapsing rules for transforming the one or more respective irrelevant values of the one or more respective structured values of the one or more respective product attributes to the one or more respective final normalized values, thereby reducing a number of the plurality of normalization rules used in a runtime normalization process;
normalizing, with the one or more processors, the one or more respective structured values by adding the domain specific language to the runtime normalization process comprising the plurality of normalization rules, as reduced, to obtain the one or more respective final normalized values for the one or more respective structured values;
using, with the one or more processors, the plurality of normalization rules, as reduced, and a multi-class classification algorithm to train a classification model for the one or more respective product attributes of the plurality of products;
determining, with the one or more processors, additional normalization rules for transforming additional respective structured values to additional respective final normalized values based on a classification of additional respective raw source values with the classification model, the additional additional raw source values having not been normalized;
validating, with the one or more processors, the additional normalization rules;
adding, with the one or more processors, the additional normalization rules to the classification model after the additional normalization rules are validated;
extracting, with the domain specific language and the one or more processors, the additional respective structured values of the one or more respective product attributes of the plurality of products from the additional respective raw source values;
normalizing, with the one or more processors, the additional respective structured values by adding the domain specific language to the runtime normalization process comprising the plurality of normalization rules, as reduced, and also the additional normalization rules to obtain the additional respective final normalized values for the additional respective structured values; and
coordinating, with the one or more processors, a display of the additional respective final normalized values on the webpage of the online retailer on an electronic device of a user such that, when one or more of the additional respective final normalized values are selected on the display by the user, the plurality of products are automatically filtered on the webpage according to the one or more of the additional respective final normalized values of the additional respective final normalized values.

8. The method of claim 7, further comprising evaluating a precision of the classification model by:
 predicting further final normalized values of a test data set; and
 comparing one or more further respective final normalized values of the further final normalized values of the test data set with one or more true final normalized values of the test data set.

9. The method of claim 7, wherein using the plurality of normalization rules, as reduced, and the multi-class classification algorithm comprises:
 training the classification model for the one or more respective product attributes of the plurality of products by creating a resilient distributed dataset using training data, the training data comprising (1) input represented as vectors of the one or more respective product attributes and (2) output represented as a predefined label.

10. The method of claim 7, wherein optimizing the domain specific language comprises:
 (1) collapsing similar normalization rules of the plurality of normalization rules; or
 (2) using domain knowledge to guide generation of one or more normalization rules of the plurality of normalization rules.

11. The method of claim 7, wherein adding the domain specific language to the runtime normalization process comprises matching the one or more respective structured values as extracted against the plurality of normalization rules, as reduced.

12. The method of claim 7, wherein:
 the method further comprises evaluating precision of the classification model by:
  predicting further final normalized values of a test data set; and
  comparing one or more further respective final normalized values of the further final normalized values of the test data set with one or more true final normalized values of the test data set;
 using the plurality of normalization rules, as reduced, and the multi-class classification algorithm comprises:
  training the classification model for the one or more respective product attributes of the plurality of products by creating a resilient distributed dataset using training data, the training data comprising (1) input represented as vectors of the one or more respective product attributes and (2) output represented as a predefined label;
 optimizing the domain specific language comprises:
  (1) collapsing similar normalization rules of the plurality of normalization rules; or
  (2) using domain knowledge to guide generation of one or more normalization rules of the plurality of normalization rules; and
 adding the domain specific language to the runtime normalization process comprises matching the one or more respective structured values as extracted against the plurality of normalization rules, as reduced.

13. A system comprising:
 one or more processors; and
 one or more non-transitory storage devices storing computing instructions configured to run on the one or more processors and perform acts of:
  receiving, at the one or more non-transitory storage devices, a plurality of normalization rules for:
   use on a webpage of an online retailer; and
   transforming one or more respective structured values of one or more respective product attributes of a plurality of products extracted from one or more respective raw source values of one or more vendor data sheets of a plurality of vendor data sheets to one or more respective final normalized values;
  using the plurality of normalization rules, the one or more processors, and a multi-class classification algorithm to train a classification model for the one or more respective product attributes of the plurality of products;
  determining, with the one or more processors, additional normalization rules for transforming additional respective structured values to additional respective final normalized values based on a classification of additional respective raw source values with the classification model, the additional respective raw source values having not been normalized;
  validating, with the one or more processors, the additional normalization rules;
  adding, with the one or more processors, the additional normalization rules to the classification model after the additional normalization rules are validated;
  extracting, with a domain specific language and the one or more processors, the additional respective structured values of the one or more respective product attributes of the plurality of products from the additional respective raw source values;
  extracting, with the one or more processors, one or more respective irrelevant values of the additional respective structured values of the one or more respective product attributes from the additional respective structured values of the one or more respective product attributes;
  optimizing, with the one or more processors, the domain specific language by collapsing rules for transforming the one or more respective irrelevant values of the additional respective structured values of the one or more respective product attributes to the additional respective final normalized values, thereby reducing a number of the plurality of normalization rules used in a runtime normalization process;
  normalizing, with the one or more processors, the additional respective structured values by adding the domain specific language to the runtime normalization process comprising the plurality of normalization rules, as reduced, and also the additional normalization rules to obtain the additional respective final normalized values for the additional respective structured values; and
  coordinating, with the one or more processors, a display of the additional respective final normalized values on the webpage of the online retailer on an electronic device of a user such that, when one or more of the additional respective final normalized values are selected on the display by the user, the plurality of products are automatically filtered on the webpage according to the one or more of the additional respective final normalized values.

14. The system of claim 13, wherein the one or more non-transitory storage devices storing the computing instructions are configured to run on the one or more processors and perform an act of evaluating a precision of the classification model by:

predicting further final normalized values of a test data set; and
comparing one or more further respective final normalized values of the further final normalized values of the test data set with one or more true final normalized values of the test data set.

15. The system of claim 13, wherein using the plurality of normalization rules, as reduced, and the multi-class classification algorithm comprises:
training the classification model for the one or more respective product attributes of the plurality of products by creating a resilient distributed dataset using training data, the training data comprising (1) input represented as vectors of the one or more respective product attributes and (2) output represented as a predefined label.

16. The system of claim 13, wherein:
the one or more non-transitory storage devices storing the computing instructions are configured to run on the one or more processors and perform acts of:
defining the domain specific language to extract the one or more respective structured values of the one or more respective product attributes of the plurality of products from the one or more respective raw source values of one or more vendor data sheets of the plurality of vendor data sheets received by the online retailer;
extracting the one or more respective structured values of the one or more respective product attributes from the one or more respective raw source values of one or more vendor data sheets of the plurality of vendor data sheets;
normalizing the one or more respective structured values by adding the domain specific language to the runtime normalization process by matching the one or more respective structured values as extracted against the plurality of normalization rules, as reduced; and
storing the one or more respective structured values as normalized in a catalog of the online retailer; and
optimizing the domain specific language comprises:
(1) collapsing similar normalization rules of the plurality of normalization rules; or
(2) using domain knowledge to guide generation of one or more normalization rules of the plurality of normalization rules.

17. The system of claim 13, wherein:
the one or more respective raw source values comprise textual data; and
the additional normalization rules based on the classification of the one or more respective raw source values with the classification model comprise additional normalization rules based on the classification of the textual data of the one or more respective raw source values as similar between source-source or source-target data.

18. The system of claim 17, wherein the one or more non-transitory storage devices storing the computing instructions are configured to run on the one or more processors and perform an act of:
analyzing the textual data of the one or more respective raw source values with a locale-specific text analyzer.

19. The system of claim 17, wherein the one or more non-transitory storage devices storing the computing instructions are configured to run on the one or more processors and perform acts of:

determining min-wise independent permutations locality sensitive hashing signatures for the plurality of normalization rules, as reduced; and
determining a nearest match of a normalized value for each un-normalized value of the textual data of the one or more respective raw source values.

20. The system of claim 13, wherein:
using the plurality of normalization rules, as reduced, and the multi-class classification algorithm comprises:
training the classification model for the one or more respective product attributes of the plurality of products by creating a resilient distributed dataset using training data, the training data comprising (1) input represented as vectors of the one or more respective product attributes and (2) output represented as a predefined label;
the one or more respective raw source values comprise textual data;
the additional normalization rules based on the classification of the one or more respective raw source values with the classification model comprise additional normalization rules based on the classification of the textual data of the one or more respective raw source values as similar between source-source or source-target data;
the one or more non-transitory storage devices storing the computing instructions are configured to run on the one or more processors and perform acts of:
predicting further final normalized values of a test data set;
comparing one or more further respective final normalized values of the further final normalized values of the test data set with one or more true final normalized values of the test data set;
defining the domain specific language to extract the one or more respective structured values of the one or more respective product attributes of the plurality of products from the one or more respective raw source values of one or more vendor data sheets of the plurality of vendor data sheets received by the online retailer;
extracting the one or more respective structured values of the one or more respective product attributes from the one or more respective raw source values of one or more vendor data sheets of the plurality of vendor data sheets;
normalizing the one or more respective structured values by adding the domain specific language to the runtime normalization process by matching the one or more respective structured values as extracted against the plurality of normalization rules, as reduced;
storing the one or more respective structured values as normalized in a catalog of the online retailer;
analyzing the textual data of the one or more respective raw source values with a locale-specific text analyzer;
determining min-wise independent permutations locality sensitive hashing signatures for the plurality of normalization rules, as reduced; and
determining a nearest match of a normalized value for each un-normalized value of the textual data of the one or more respective raw source values; and
optimizing the domain specific language comprises:
(1) collapsing similar normalization rules of the plurality of normalization rules; or (2) using domain knowledge to guide generation of one or more normalization rules of the plurality of normalization rules.

* * * * *